United States Patent [19]
Lawther et al.

[11] Patent Number: 5,829,860
[45] Date of Patent: Nov. 3, 1998

[54] VARIABLE NUMBER MULTI-LAMP FLASH CARRIER AND CAMERA

[75] Inventors: Joel S. Lawther, East Rochester, N.Y.; Ralph M. Lyon, Marshfield, Wis.

[73] Assignee: Eastman Kodak Company, Rochester, N.Y.

[21] Appl. No.: 802,176

[22] Filed: Feb. 14, 1997

[51] Int. Cl.⁶ .................................................. G03B 15/02
[52] U.S. Cl. ............................... 362/11; 362/13; 362/16; 431/359
[58] Field of Search ............................... 431/359; 362/11, 362/13, 14, 15, 16, 255

[56] References Cited

U.S. PATENT DOCUMENTS

| | | | |
|---|---|---|---|
| 2,254,888 | 9/1941 | Margitta | 431/359 |
| 2,839,667 | 6/1958 | Cannella | 431/359 |
| 2,852,134 | 9/1958 | Werner | 431/359 |
| 3,238,749 | 3/1966 | Reiber et al. | 362/13 |
| 3,866,033 | 2/1975 | Stacy et al. | 362/14 |
| 3,919,539 | 11/1975 | Winkler et al. | 362/14 |
| 4,098,565 | 7/1978 | Van de Weijer | 431/93 |
| 4,347,053 | 8/1982 | Fohl et al. | 431/359 |
| 4,462,063 | 7/1984 | English | 362/11 |

*Primary Examiner*—Stephen F. Husar
*Attorney, Agent, or Firm*—Roger A. Fields

[57] ABSTRACT

A multi-lamp flash carrier comprises a plurality of flash lamps and a lamp support for arranging the individual lamps in a spatial succession. The lamp support includes respective lamp holders for the individual lamps, which have integral resilient couplers for connecting the lamp holders to one another and for permitting separation of the lamp holders from one another to selectively change the number of lamp holders for the lamp support and, thus, similarly change the number of flash lamps for the multi-lamp flash carrier. A camera to be used with the multi-lamp flash carrier has a drive for moving the multi-lamp flash carrier to advance the flash lamps successively to a use position for illuminating a subject being photographed. The drive is adjustable to accommodate changing the number of flash lamps for the multi-lamp flash carrier.

9 Claims, 6 Drawing Sheets

VARIABLE NUMBER MULTI-LAMP FLASH CARRIER AND CAMERA

FIELD OF THE INVENTION

The invention relates generally to the field of photography and, in particular, to a multi-lamp flash carrier and to a camera for use with the multi-lamp flash carrier.

BACKGROUND OF THE INVENTION

It is known for a camera to be used with an inexpensive, replaceable, multi-lamp flash wheel instead of a more expensive, built-in, electronic flash. For example, prior art U.S. Pat. No. 4,098,565 issued Jul. 4, 1978 discloses a multi-lamp flash wheel in which the flash lamps are arranged radially in a fan-like circular array with respective inner ignition ends of the lamps being relatively close to one another and respective opposite light-emitting ends of the lamps being relatively far from one another. The circular array of flash lamps is rotated inside the camera to advance the lamps successively into a slot-like recess at the front of the camera, to use the lamps. Each one of the lamps is positioned in the recess with its opposite end protruding radially from the recess towards a subject to be photographed. A fixed, faceted, reflector at opposite sides of the recess reflects flash illumination substantially radially from the lamp in the recess. A percussion spring is located to strike an ignition stem or ferrule of the lamp in the recess to ignite the lamp. This design is limited to a single number of flash lamps which cannot be altered.

Alternatively, prior art U.S. Pat. No. 3,866,033 issued Feb. 11, 1975 discloses an endless movable chain of serially arranged flash lamps. Each one of the flash lamps is provided with its own associated percussion spring and reflector segment. However, like the first example, this design is limited to a single number of flash lamps which cannot be altered.

SUMMARY OF THE INVENTION

According to one aspect of the invention a multi-lamp flash carrier comprising a plurality of flash lamps, and a lamp support for arranging the individual lamps in a spatial succession, is characterized in that:

the lamp support includes respective lamp holders for the individual lamps which have coupling means for connecting the lamp holders to one another and for permitting separation of the lamp holders from one another to selectively change the number of lamp holders for the lamp support and, thus, similarly change the number of flash lamps for the multi-lamp flash carrier.

According to another aspect of the invention a camera to be used with a multi-lamp flash carrier which is capable of undergoing a change in the number of its flash lamps, comprises means for moving the multi-lamp flash carrier to advance the flash lamps successively to a use position for illuminating a subject being photographed, and is characterized in that:

the means for moving the multi-lamp flash carrier is adjustable to accommodate changing the number of flash lamps for the multi-lamp flash carrier.

DETAILED DESCRIPTION OF THE INVENTION

The invention is disclosed as being embodied preferably in a multi-lamp flash carrier and a camera for use with the multi-lamp flash carrier. Because the features of a multi-lamp flash carrier and a camera are generally known, the description which follows is directed in particular only to those elements forming part of or cooperating directly with the disclosed embodiment. It is to be understood, however, that other elements may take various forms known to a person of ordinary skill in the art.

Preferred Embodiment

Figure 1:
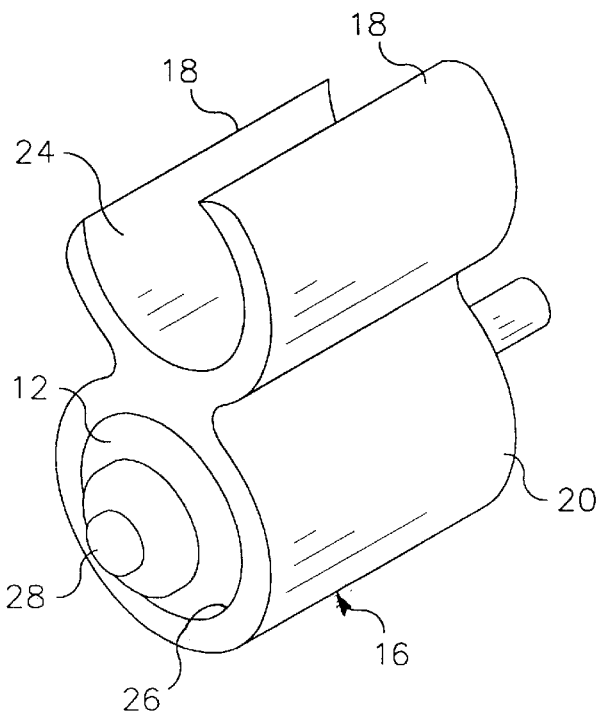
FIG. 1 is a is an assembled perspective view of a single lamp holder and flash lamp, pursuant to a preferred embodiment of the invention.
Figure 2:
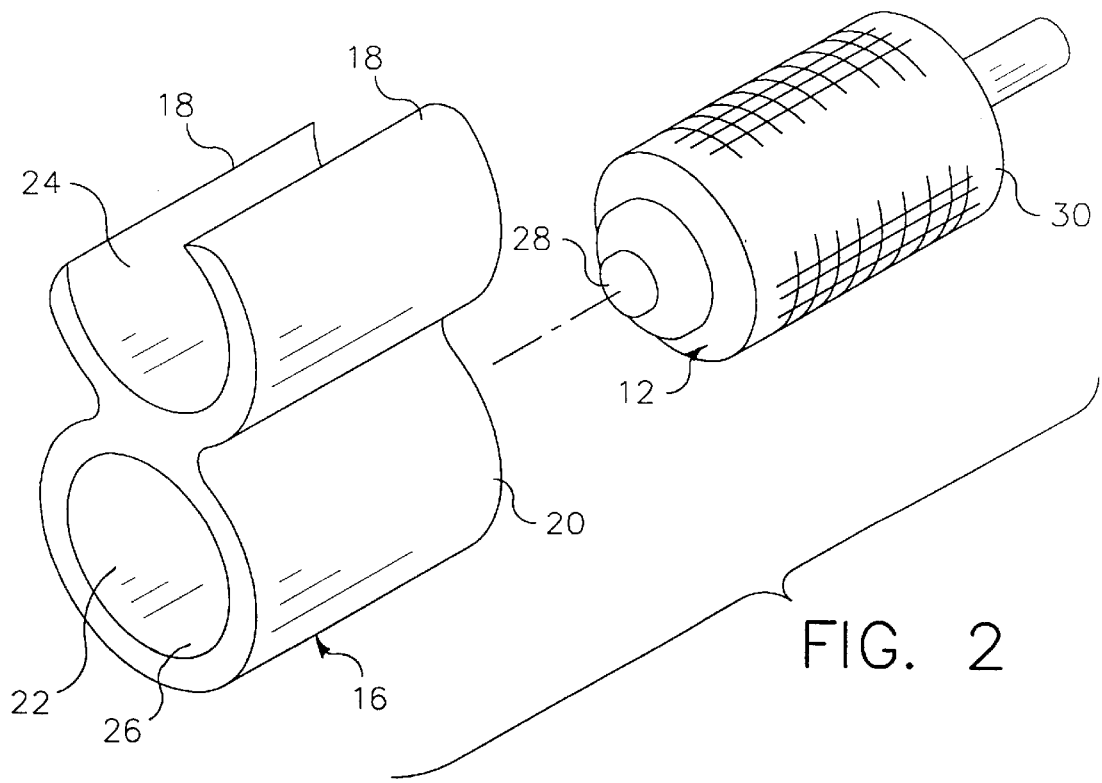
FIG. 2 is an exploded perspective view of the lamp holder and flash lamp as shown in FIG. 1.
Figure 3:
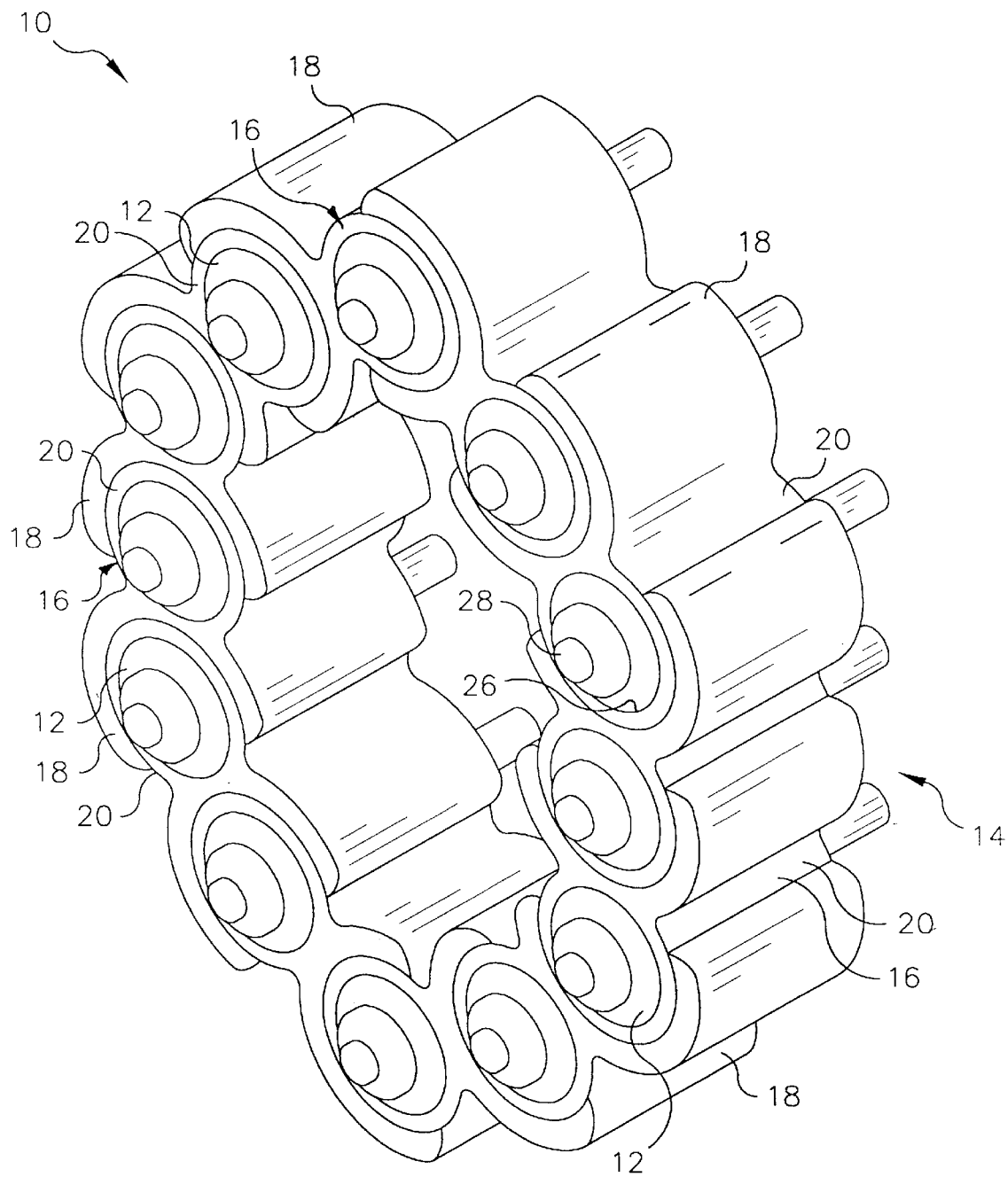
FIG. 3 is an assembled perspective view of an endless movable chain of the lamp holders and flash lamps, pursuant to the preferred embodiment of the invention.

Referring now to the drawings, FIGS. 1–3 show a preferred embodiment of a multi-lamp flash carrier 10 comprising a plurality of flash lamps 12, and an endless lamp support 14 for arranging the individual lamps in a spatial succession.

The endless lamp support 14 includes respective identical lamp holders 16 for the individual lamps 12, which each have a pair of integral resilient coupling jaws 18. The pairs of coupling jaws 18 are for connecting the lamp holders 16 pivotally to one another to permit the endless lamp support 14 to be formed as an endless movable chain of the lamp holders and to permit manual separation of the lamp holders from one another to selectively change the number of lamp holders for the lamp support and, thus, similarly change the number of flash lamps 12 for the multi-lamp flash carrier 10. See FIGS. 1–3. The lamp holders 16 have respective circular portions 20 with individual central openings 22. The pairs of coupling jaws 18 of the lamp holders 16 are, in effect, semi-circular resilient portions (same reference number 18 as the pairs of coupling jaws) of the lamp holders which are integral with the circular portions 20 of the lamp holders, and they form individual central openings 24 for receiving one of the circular portions 20 of the lamp holders 16 to connect the lamp holders pivotally to one another. See FIG. 3.

The respective circular portions 20 of the lamp holders 16 have individual open ends 26 in addition to their individual central openings 22 for containing one of the flash lamps 12. See FIGS. 1 and 2. The flash lamps 12 have respective light-emitting ends 28 for emitting flash illumination from the open ends 26 of the circular portions 20, and they have respective reflective circumferences 30 for reflecting flash illumination towards the light-emitting ends.

Figure 4:
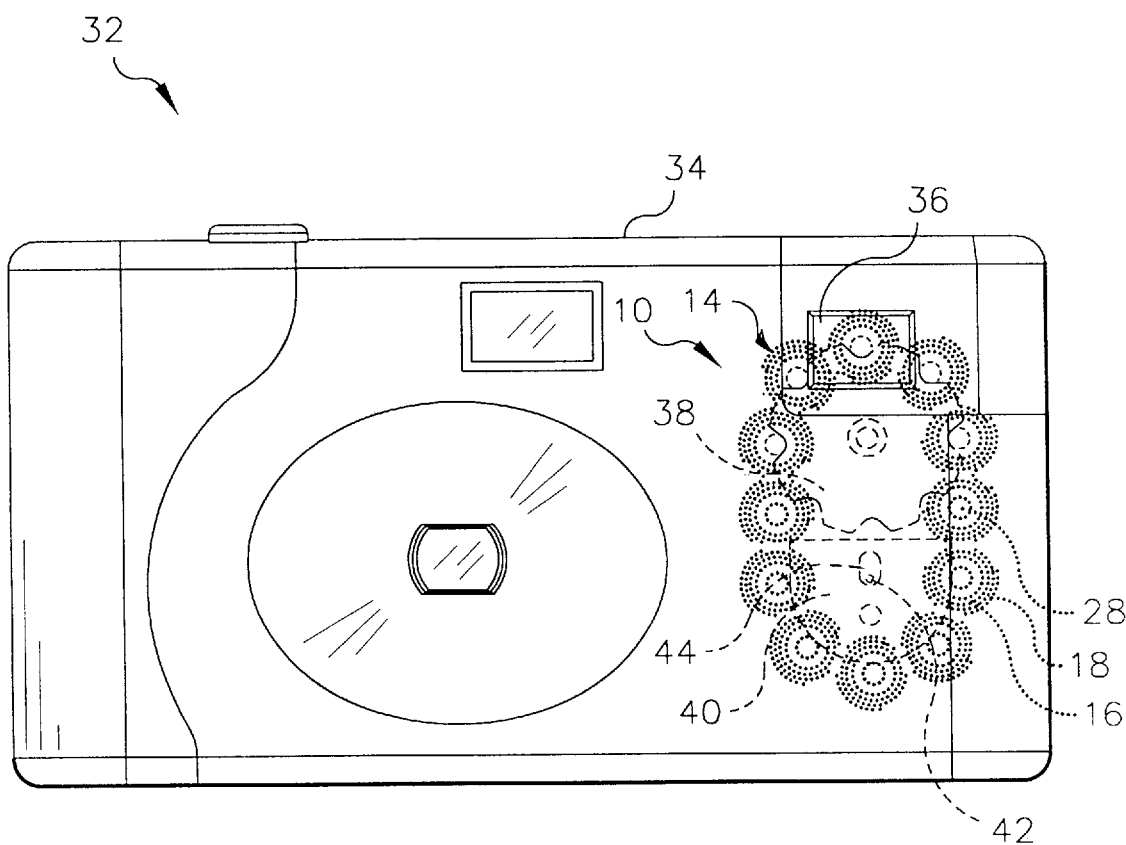
FIG. 4 is a front elevation view of a camera used with the endless movable chain of the lamp holders and flash lamps depicted in FIG. 3.

As shown in FIG. 4, a camera 32 to be used with the multi-lamp flash carrier 10 has a housing 34 with a flash emission window 36. A motor-driven sprocket 38 is rotatable in engagement with the endless lamp support 14, inside the housing 34, to advance the flash lamps 12 successively to a use position at the flash emission window 36, to illuminate a subject being photographed. Since the number of lamp holders 16 and flash lamps 12 can be similarly changed (which will change the length of the endless lamp support 14), a guide piece 40 around which the endless lamp support is moved is adjustable commensurate with a change in the length of the endless lamp support. The guide piece 40 is secured in place via a holding screw 42 that extends through a slot 44 in the guide piece. Temporarily loosening the holding screw 42 allows the guide piece 40 to be moved closer to or farther away from the sprocket 38 to accommodate a change in the length of the endless lamp support 14.

Alternate Embodiment

Figure 5:
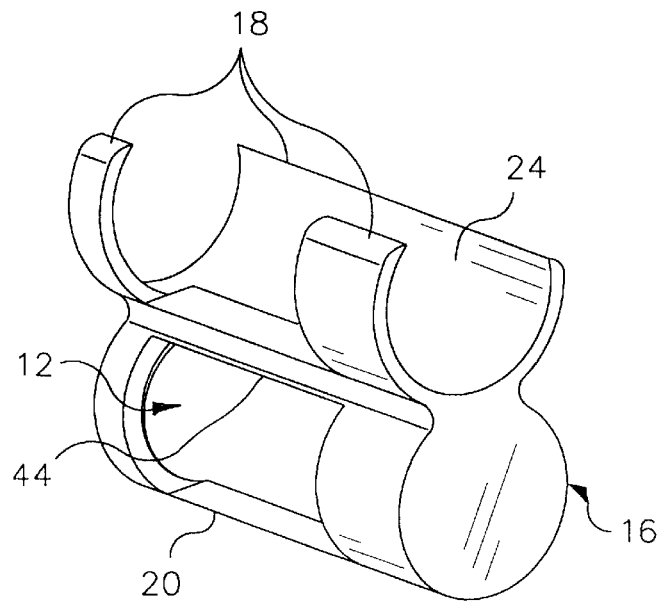
FIG. 5 is a is an assembled perspective view of a single lamp holder and flash lamp, pursuant to an alternate embodiment of the invention.
Figure 6:
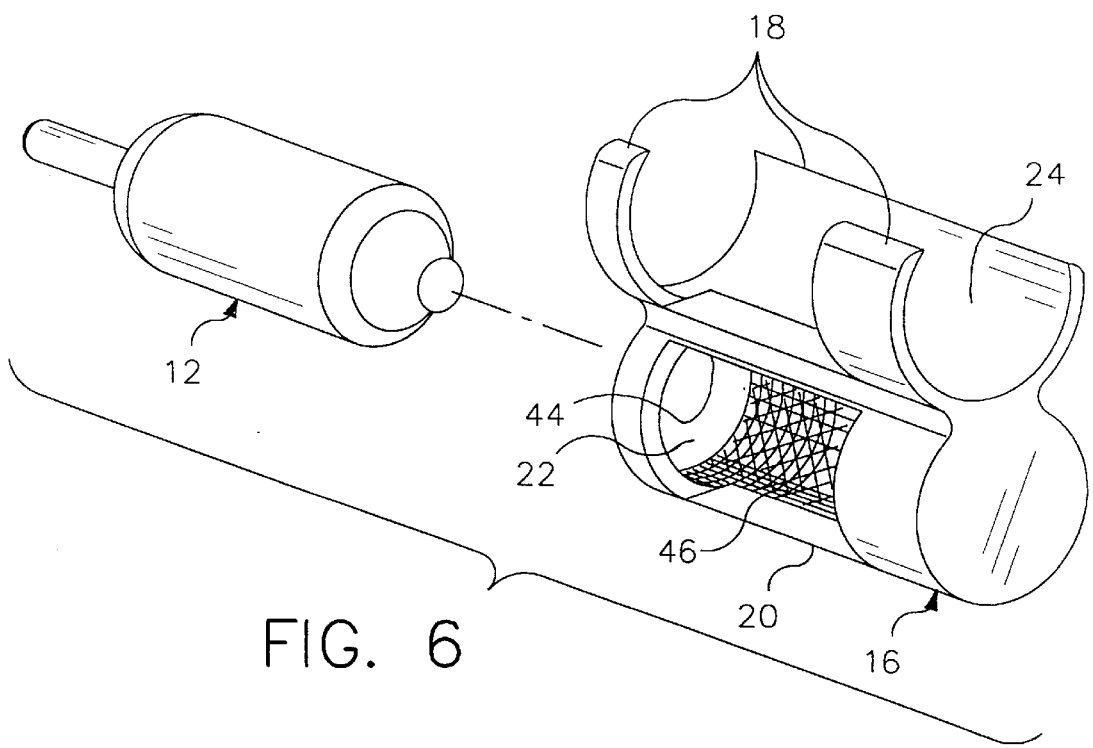
FIG. 6 is an exploded perspective view of the lamp holder and flash lamp as shown in FIG. 5.
Figure 7:
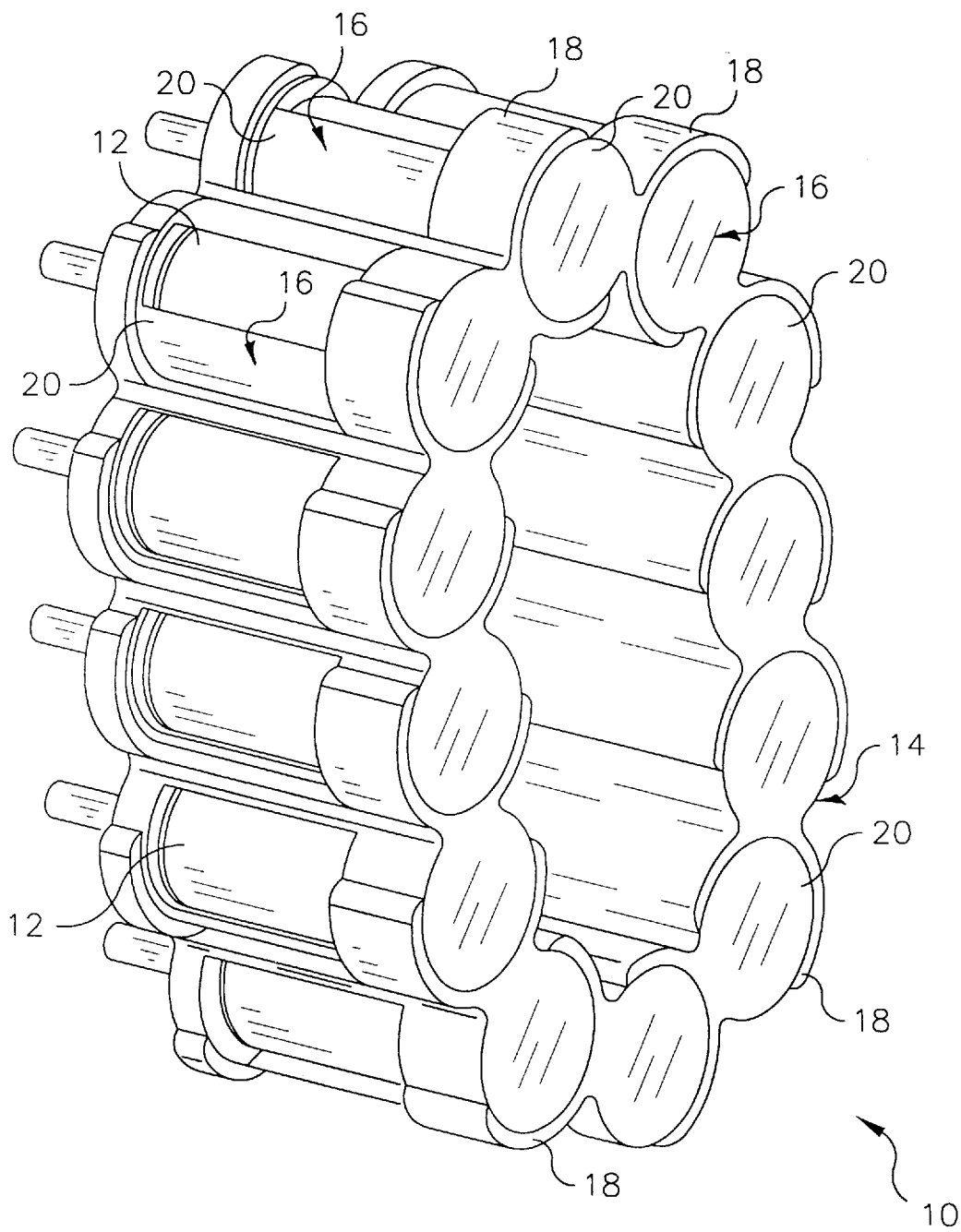
FIG. 7 is an assembled perspective view of an endless movable chain of the lamp holders and flash lamps, pursuant to the alternate embodiment of the invention.
Figure 8:
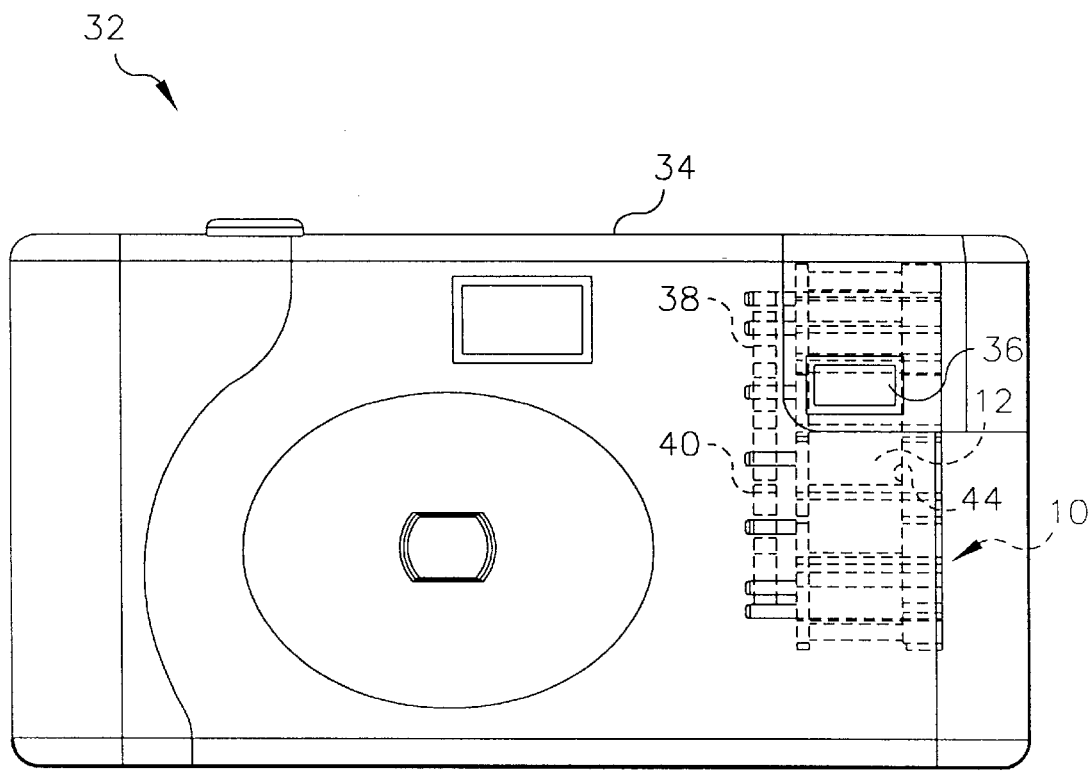
FIG. 8 is a front elevation view of a camera used with the endless movable chain of the lamp holders and flash lamps depicted in FIG. 7.

The alternate embodiment shown in FIGS. 5–8 is the same as the preferred embodiment shown in FIG. 1–4 except that the respective circular portions 20 of the lamp holders 16 have individual side openings 44 and reflective interiors 46 as shown in FIGS. 5–7. Moreover, the circumferences of the flash lamps 12 are light-emitting, rather than reflective as in the preferred embodiment. Flash illumination is emitted from the side openings 44 in the circular portions 20 in FIG. 5, rather than from the open ends 26 of the circular portions as in FIG. 1.

The invention has been described with reference to a preferred embodiment. However, it will be appreciated that variations and modifications can be effected by a person of ordinary skill in the art without departing from the scope of the invention.

PARTS LIST 10. multi-lamp flash carrier
12. flash lamps
14. endless lamp support
16. lamp holders
18. pairs of coupling jaws
20. circular portions
22. central openings
24. central openings
26. open ends
28. light-emitting ends
30. reflective circumferences
32. camera
34. housing
36. flash emission window
38. sprocket
40. guide piece
42. holding screw
44. side openings
46. reflective interiors

What is claimed is:

1. A multi-lamp flash carrier comprising a plurality of flash lamps, and a lamp support for arranging said individual lamps in a spatial succession, is characterized in that:

said lamp support includes respective lamp holders for said individual lamps which have coupling means for connecting said lamp holders to one another and for permitting separation of the lamp holders from one another to selectively change the number of lamp holders for the lamp support and, thus, similarly change the number of flash lamps for said multi-lamp flash carrier.

2. A multi-lamp flash carrier as recited in claim 1, wherein said coupling means of said lamp holders are resilient integral portions of the lamp holders.

3. A multi-lamp flash carrier as recited in claim 1, wherein said coupling means of said lamp holders connect the lamp holders pivotally to permit said lamp support to be formed as an endless movable chain of the lamp holders.

4. A multi-lamp flash carrier as recited in claim 1, wherein said lamp holders include respective circular portions having individual central openings for containing one of said flash lamps and said coupling means of the lamp holders include respective semi-circular resilient portions integral with said circular portions and having individual central openings for receiving one of said circular portions to connect said lamp holders pivotally.

5. A multi-lamp flash carrier as recited in claim 1, wherein said lamp holders includes respective circular portions having individual central openings for containing one of said flash lamps and individual open ends, and said flash lamps have respective light-emitting ends for emitting flash illumination from said open ends of said circular portions and respective reflective circumferences for reflecting flash illumination towards said light-emitting ends.

6. A multi-lamp flash carrier as recited in claim 1, wherein said lamp holders include respective circular portions having individual central openings for containing one of said flash lamps, reflective interiors within said central openings and individual side openings, and said flash lamps have respective light-emitting circumferences for emitting flash illumination to said reflective interiors of said circular portions and from said side openings of the circular portions.

7. A multi-lamp flash carrier comprising a plurality of flash lamps, and a lamp support for arranging said individual lamps in a spatial succession, is characterized in that:

said lamp support includes respective circular portions having individual central openings for containing one of said flash lamps and individual open ends, and said flash lamps have respective light-emitting ends for emitting flash illumination from said open ends of said circular portions and respective reflective circumferences for reflecting flash illumination towards said light-emitting ends.

8. A multi-lamp flash carrier comprising a plurality of flash lamps, and a lamp support for arranging said individual lamps in a spatial succession, is characterized in that:

said lamp support includes respective circular portions having individual central openings for containing one of said flash lamps, reflective interiors within said central openings and individual side openings, and said flash lamps have respective light-emitting circumferences for emitting flash illumination to said reflective interiors of said circular portions and from said side openings of the circular portions.

9. A camera comprising a housing, a flash emission window in said housing, a multi-lamp flash carrier provided with a plurality of flash lamps and a lamp support for arranging said individual lamps in a spatial succession, and means for moving said multi-lamp flash carrier in said housing to advance said individual lamps successively to said flash emission window, is characterized in that:

said lamp support includes respective lamp holders for said individual lamps which have coupling means for connecting said lamp holders to one another and for permitting separation of the lamp holders from one another to selectively change the number of lamp holders for the lamp support and, thus, similarly change the number of flash lamps for said multi-lamp flash carrier; and said means for moving said multi-lamp flash carrier is adjustable to accommodate changing the number of lamp holders for said lamp support and similarly changing the number of flash lamps for said multi-lamp flash carrier.

* * * * *